United States Patent [19]
Bracher et al.

[11] 3,881,524
[45] May 6, 1975

[54] SHUTTLE RETURN APPARATUS

[75] Inventors: Hans Bracher, Burgdorf; Heinz Baumann, Winterthur, both of Switzerland

[73] Assignee: Sulzer Brothers Limited

[22] Filed: Sept. 10, 1973

[21] Appl. No.: 395,560

[30] Foreign Application Priority Data
Sept. 8, 1972   Switzerland...................... 13195/72

[52] U.S. Cl. .............................................. 139/126
[51] Int. Cl............................................ D03d 47/24
[58] Field of Search ........ 139/12, 125, 126; 193/25, 193/40; 198/168, 174

[56] References Cited
UNITED STATES PATENTS
2,761,633   9/1956   Sindzinski.............................. 193/40
3,095,074   6/1963   Neidhardt.............................. 193/40
3,263,705   8/1966   Rossmann............................... 139/12
3,543,807   12/1970  Moessinger........................... 139/125
3,674,160   7/1972   Gutowski.............................. 198/173

FOREIGN PATENTS OR APPLICATIONS
1,440,165   4/1966   France................................ 139/125

Primary Examiner—Henry S. Jaudon
Attorney, Agent, or Firm—Pennie & Edmonds

[57] ABSTRACT

An endless belt or chain having shuttle carrying or propelling elements attached thereto extends across a loom, for example of gripper shuttle type, to return the shuttles from the catching to the picking side of the loom. Braking means are provided to retard the return motion of the shuttles, preventing oscillation or chattering thereof on their arrival at the picking side.

10 Claims, 10 Drawing Figures

SHUTTLE RETURN APPARATUS

The invention pertains to apparatus for the return of picking devices, such as shuttles, from the catching to the picking side of a loom for their repeated use in the insertion of weft threads into the cloth being woven. The apparatus of the invention includes an endless belt, one run of which serves to carry the weft insertion elements (hereinafter for brevity called shuttles) back from the catching to the picking side of the loom with the help of carrier elements fastened to the belt. Apparatus of this character is advantageously provided in looms using gripper shuttles in which, for example, some 10 to 20 shuttles are employed to carry weft threads through the shed and are returned from the catching to the picking side for renewed use. Gripper shuttles are shuttles which pull the weft threads through the shed instead of unwinding it from a spool or pirn contained in the shuttle.

In one previously known form of apparatus of this general character, the shuttles are delivered by the carrier elements of the belt to a groove or slot formed in the loom frame or in a housing for the entire shuttle return mechanism. As a result however of vibration or oscillation of the belt, due for example to the oscillatory action of the reed in beating up the weft, the shuttles are subjected to blows from these carrier elements on the belt. As a result, the shuttles are sometimes projected by the carrier elements, instead of being carried or pushed by them, and may strike against carrier elements on the belt closer to the picking side, or against other parts of the loom structure. This can interrupt proper functioning of the mechanism and results in jolting, wear and abrasion of the shuttles and of the loom structure against which they strike, requiring premature replacement. The abraded shuttles may on passage through the shed during picks unduly wear the teeth of the shuttle race and/or the shuttle decelerating mechanism which forms part of the catcher.

It is an object of the invention to provide a shuttle return mechanism improved in these respects. The invention provides to this end a braking or retarding mechanism which operates on the shuttles in the course of their return trip from the catching to the picking side of the loom. According to the location of this decelerating mechanism, a slower and more uniform motion is obtained for the shuttles, either over the entire return path thereof or over the end portion of that path adjacent to the picking side of the loom. The result is that the shuttles do not get ahead of the carrier elements therefor on the belt and do not strike against the removable stop flaps or shutters therefor provided to prevent premature entry of the shuttles into the lifter mechanism which is to deliver them one by one for new picks. The invention also prevents oscillation or hunting of the shuttles as they approach their rest position on the picking side. Instead, by operation of the invention the shuttles are decelerated without oscillations and are brought safely and uniformly to a stop. The return of the shuttles is therefore carried out dependably and quietly, and neither those elements nor other structure of the loom undergoes unnecessary and premature wear.

BRIEF DESCRIPTION OF THE DRAWINGS

The invention will now be further described in terms of a number of presently preferred exemplary embodiments and in connection with the accompanying drawings in which.

DESCRIPTION OF PREFERRED EMBODIMENTS

Figure 1:
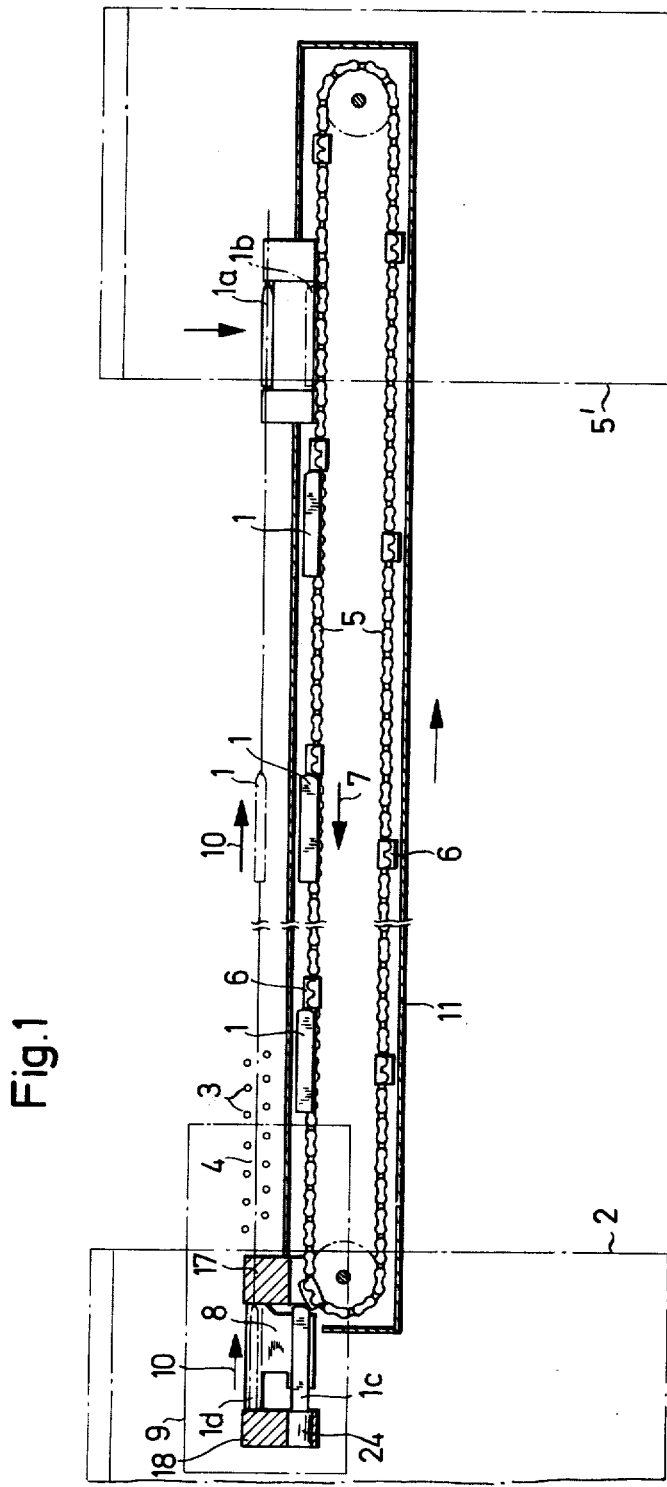
FIG. 1 is a diagrammatic representation of one embodiment of the invention shown in conjunction with those portions of a loom essential to an explanation of the present invention.

Referring to FIG. 1, the gripper shuttles 1 of a gripper shuttle loom are, during operation of the loom, propelled along a path 10 from a picking device 2 through a shed 4 formed of warp threads 3 to a catcher mechanism 5', where they are brought to rest in the position 1a. From this position they are guided, by guide means not shown, to a position 1b, for engagement with the shuttle return mechanism and return to the picking side of the loom. This mechanism includes an endless chain 5 to which carrier elements 6 are fastened. The carrier elements are best seen in FIGS. 6, 7, 8 and 10. They may be approximately of the type shown in the copending application of George Ziegler et al., Ser. No. 233,262, filed Mar. 9, 1972, which is assigned to the assignee hereof.

The shuttles 1 are transported by these carrier elements 6 back to the picking mechanism along the path indicated by the arrow 7, and are delivered to the picking mechanism at the position 1c. The upper and lower runs of the chain move in separate slots or channels within a casing 11.

From the position 1c the shuttles are lifted by a lifting mechanism 8 back into the starting position 1d where they are available for the picking of further threads into the shed. On the return journey from the catching to the picking side, the shuttles are subjected to a retarding or braking action, preferably over the range of travel identified by the dash-line box 9 although this action may extend over the entire path. In this way there is achieved the result that, at least over the right hand portion of the length 9 of the path, each of the shuttles remains in contact with its carrier element 6, and arrives without oscillation at the rest position 1c.

Figure 2:
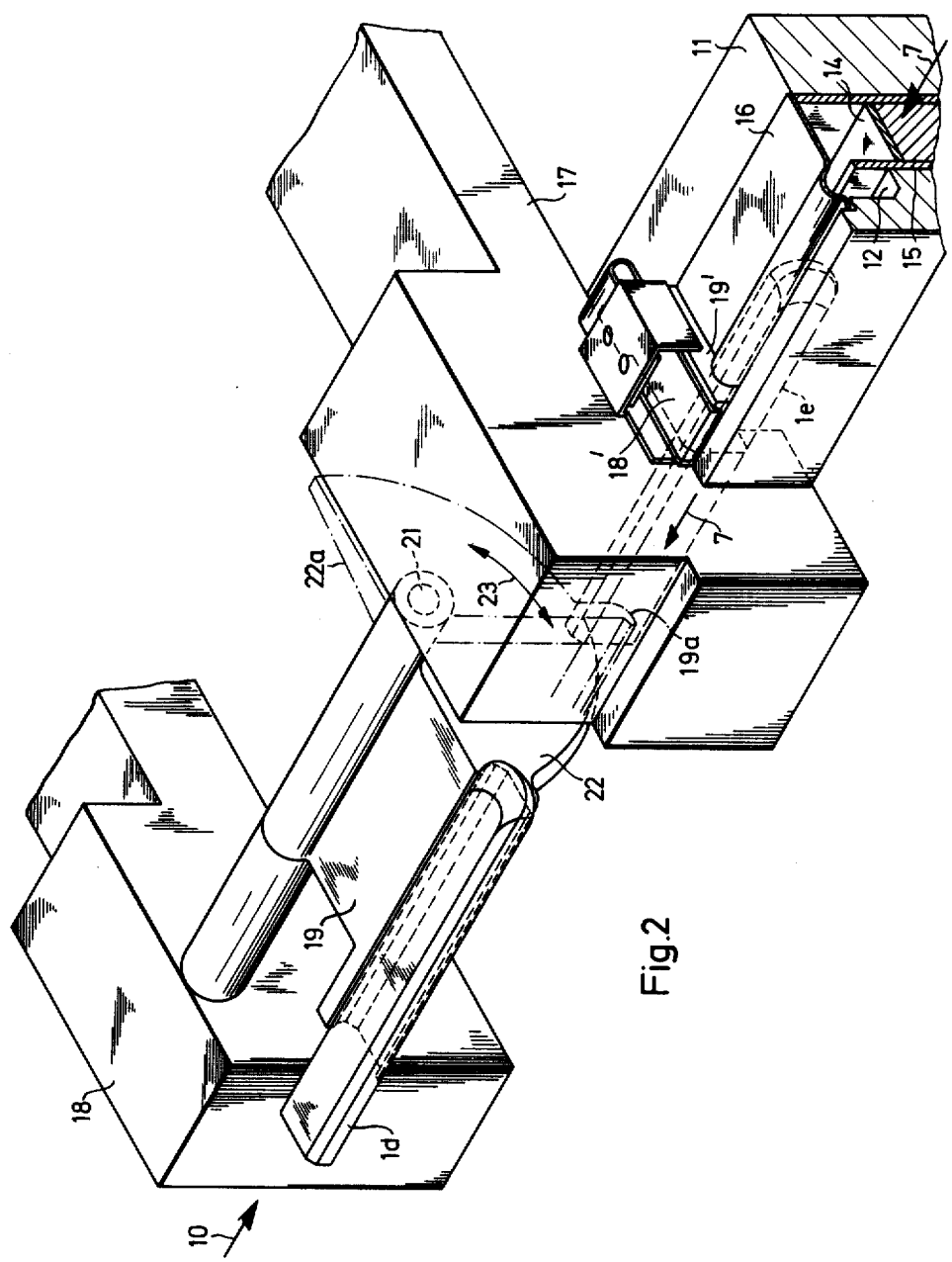
FIG. 2 is a perspective view of a portion of the shuttle return mechanism of FIG. 1.

In FIG. 2 there is shown in perspective that portion of the chain housing 11 seen at the left in FIG. 1, and, beyond that portion, other elements of the picking mechanism and of the shuttle return mechanism by which the shuttles returned along the chain 5 are represented to the picker.

In FIG. 2, a casing 11 for the return mechanism is provided with a groove or slot 12 through which the shuttles are delivered, in the direction indicated by the arrow 7, by the upper run of the chain 5 and its transport elements 6. Adjacent to slot or channel 12 is provided a further slot 14 which is separated from the slot 12 by a guide strip 15. The chain 5 and its carrier elements 6 pass through the slot 14, the carrier elements 6 extending over and beyond the strip 15 to penetrate into the channel and thereby to push the shuttles through the channel 12 from the catching to the picking side of the loom. The two slots or channels 12 and 14 are protected by a cover 16. Shortly before reaching the end of its return travel, i.e., prior to entering the inner picking block 17, the shuttle 1 is decelerated by a braking device. This may take the form of a plate or shoe 19' which is subjected to the action of a spring 18' pressing down on the shuttle when it reaches the position 1e. The inner picking block 17 and the outer picking block 18 are components of the picking device or picking box 2.

Between the inner block 17 and an outer picking block 18 of the picker there is disposed the shuttle lifter 19 which rotates about an axis 21. The shuttle lifter includes a segment-shaped shutter 22 which is subjected to arcuate motion as indicated by the arrow 23. By operation of the plate 22 when it occupies the position shown therefor in full lines, the shuttle shown in dashed lines at 1e is prevented from moving further to the left in FIG. 2 and thereby from entering prematurely the region where it can be seized by the shuttle lifter 19. When the plate 22 is in the dash-line position shown at 22a therefor, the shuttle lifter 19 is in the vertical position shown at 19a, the plate 22 having been withdrawn to its inoperative position. With the plate 22 in the position 22a therefor, the shuttle can move from the position 1e and be propelled by the carrier element 6 into the position 1c therefor (FIG. 1). In this position it lies against the yielding, resilient stop 24 (FIG. 1) of the outer picking block 18.

At this phase of the operation, shuttle lifter 19 and the plate 22 are again returned to their forward position, i.e., are rotated clockwise, as seen in FIG. 2, back to the position which they occupy in FIG. 2, so that the shuttle is lifted into its ready position 1d for a new pick.

Figure 3:
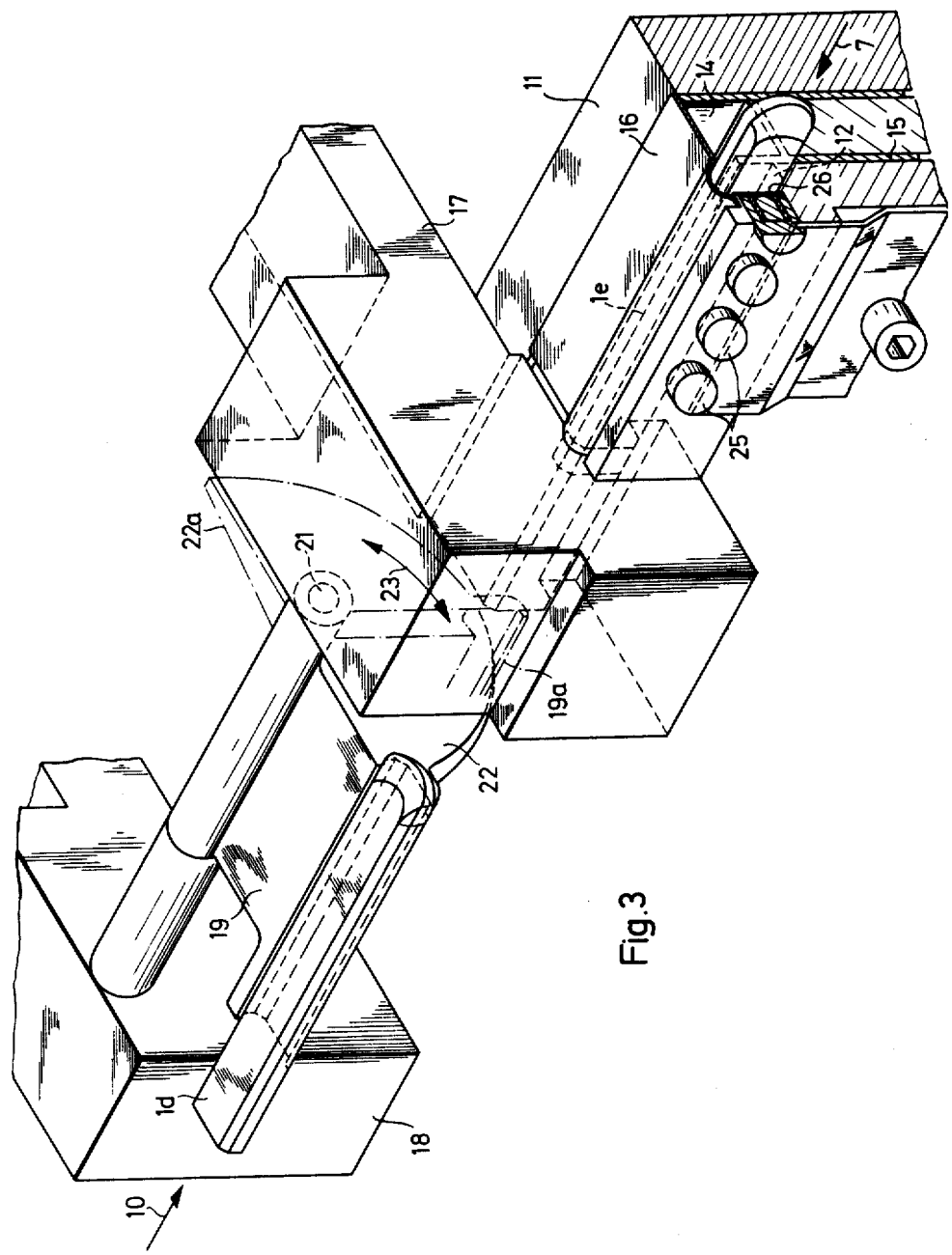
FIG. 3 shows a modified form of construction for the apparatus shown in FIG. 2.

In the embodiment of FIG. 3 there are provided a plurality of permanent magnets 25 to act as braking elements on the shuttle, in place of the brake 19' in FIG. 2. These elements are spaced from the shuttle channel 12 by a sheet of, for example, snythetic plastic material 26, to prevent wear on the shuttles as they pass to the position 1e. The shuttles being made primarily of ferromagnetic material, the magnets 25 draw them against the sheet 26 and thereby subject them to a frictional retarding force.

Figure 4:
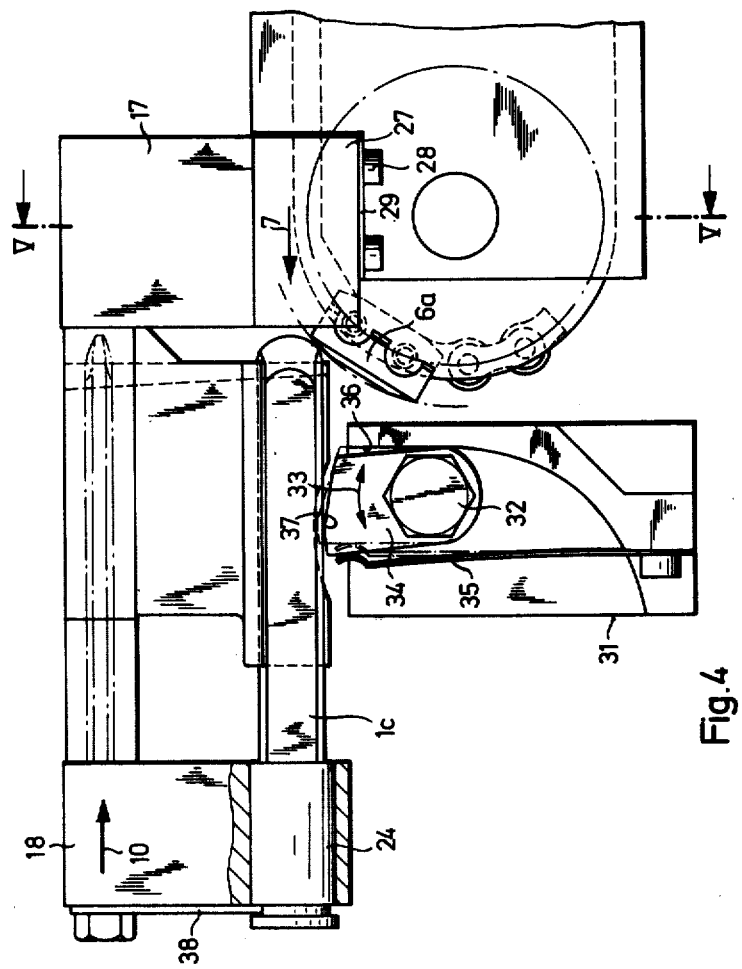
FIG. 4 is a view in elevation of a further embodiment, partly shown however in section.

FIG. 4 is a fragmentary view in elevation of the chain 5 at the picking side of the loom and of the shuttle braking and lifting devices in another embodiment of the invention.

Figure 5:
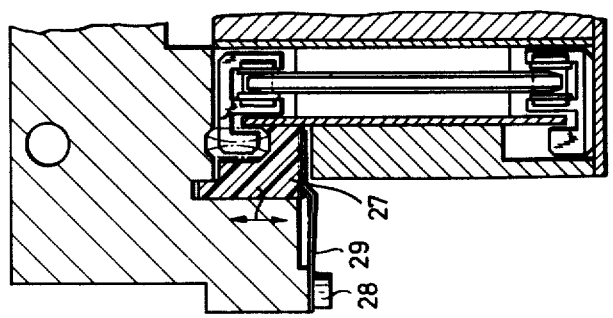
FIG. 5 is a sectional view taken on the line V — V in FIG. 4.

In the embodiment of FIGS. 4 and 5 a first brake is provided in the inner block 17. This mechanism includes a brake block 27 which is subjected to the action of a leaf spring 29, adjustable by operation on a screw 28. The function of the spring 29 is to stress the brake block 27 upwards. The shuttle is therefore decelerated by frictional engagement at its lower face.

Additionally there is provided between the inner and outer picking blocks 17 and 18 a supppementary brake 31 to prevent backward motion of the shuttles. The braking device 31 includes a block or shoe 34 which is susceptible to arcuate motion, indicated by the arrow 33, about an axis defined by the bolt 32. A leaf spring 35 stresses the block 34 clockwise, as seen in FIG. 4 against a stop 36. The shoe 34 has, as indicated at 37, an end face which at the left limit thereof in FIG. 4 extends farther from the axis of bolt 32 than it does at the right limit thereof. When, under the momentum imparted to it by chain 5, an arriving shuttle passes to the left in FIG. 4 over the shoe 34, the shuttle will, by cam action at the end face 37, rotate the shoe 34 counter-clockwise through a short angular motion against the action of the spring 35. Through this action the shuttle is decelerated. By reason of this profile of the braking element 34 at 37, the shuttle is moreover prevented from moving backwardly (to the right in FIG. 4), as might occur after impact of the shuttle against the stop 24 which in turn is subjected to the action of the spring 38. Oscillatory motions of the shuttle between the position 1c and the carrier element 6a on the chain are thereby forestalled.

FIGS. 6, 7, 8 and 10 all show cross-sectional views through the chain casing 11 in various embodiments of the invention. The upper and lower runs of the chain are clearly seen and also the shuttle carrier or pusher elements 6 which push the shuttles through the return shuttle race 12.

Figure 6:
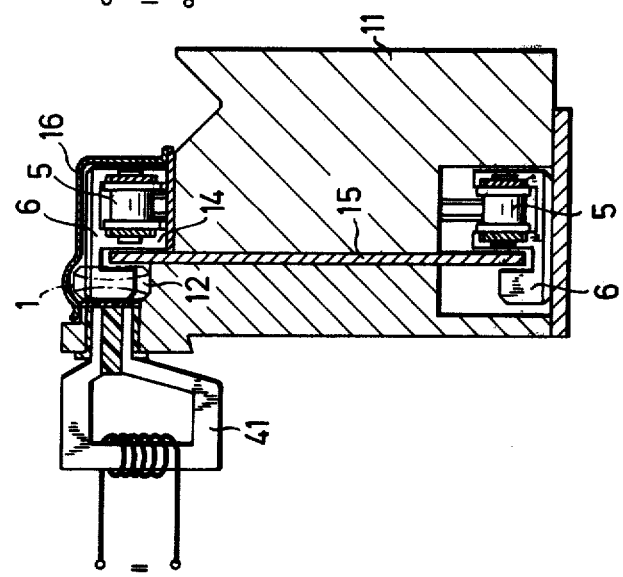

FIG. 6 shows a braking arrangement which includes an electro-magnet 41. This electro-magnet can be used in place of the permanent magnets 25 of FIG. 3. The electro-magnet will in this embodiment be continuously energized.

Figure 7:
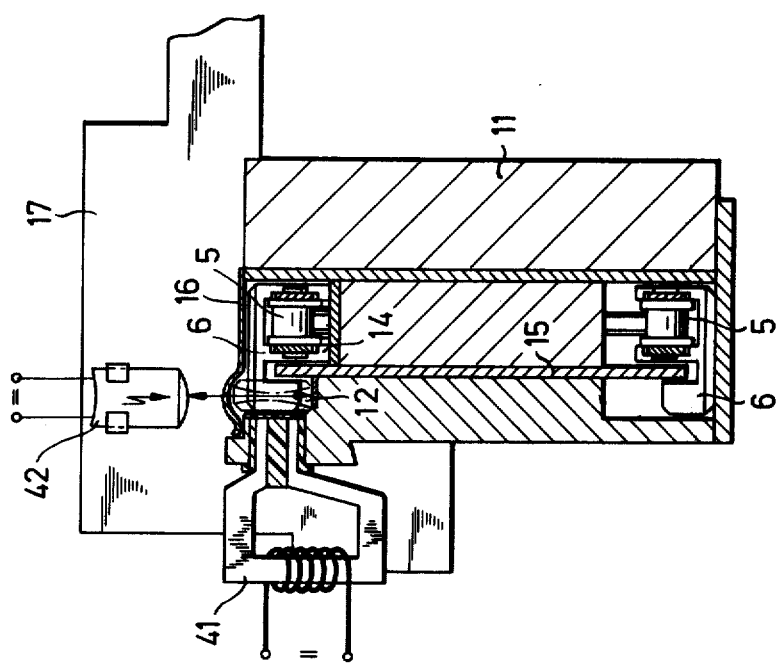
FIGS. 6 to 8 are sectional views similar to that of FIG. 5 but showing modified constructions according to the invention.

In the embodiment of FIG. 7 the electro-magnet is controlled by operation of a photo-cell 42 in such a fashion that the magnet is energized only upon arrival of a shuttle. The braking action is therefore applied only when a shuttle is present to be retarded. The photo-cell 42 is disposed along the return path of the shuttle from the catching to the picking side of the loom, upstream of the electro-magnet in that return travel.

Figure 8:
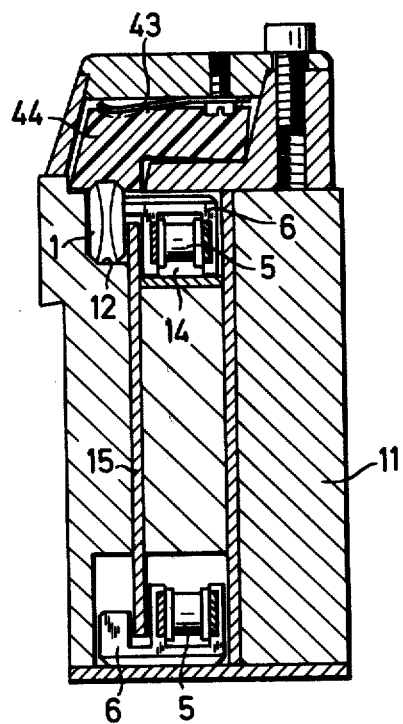

In the embodiment of FIG. 8 the shuttle is decelerated by operation of a braking element or shoe 44 which is disposed above the shuttle path and which is subjected to the action of a spring 43. The brake shoe 44 comprises an absorptive, sponge-like material such as felt which is saturated with a liquid lubricant. The shuttles are consequently continuously lubricated at the upper surface thereof, which is advantageous for proper operation of the weft insertion process.

Figure 9:
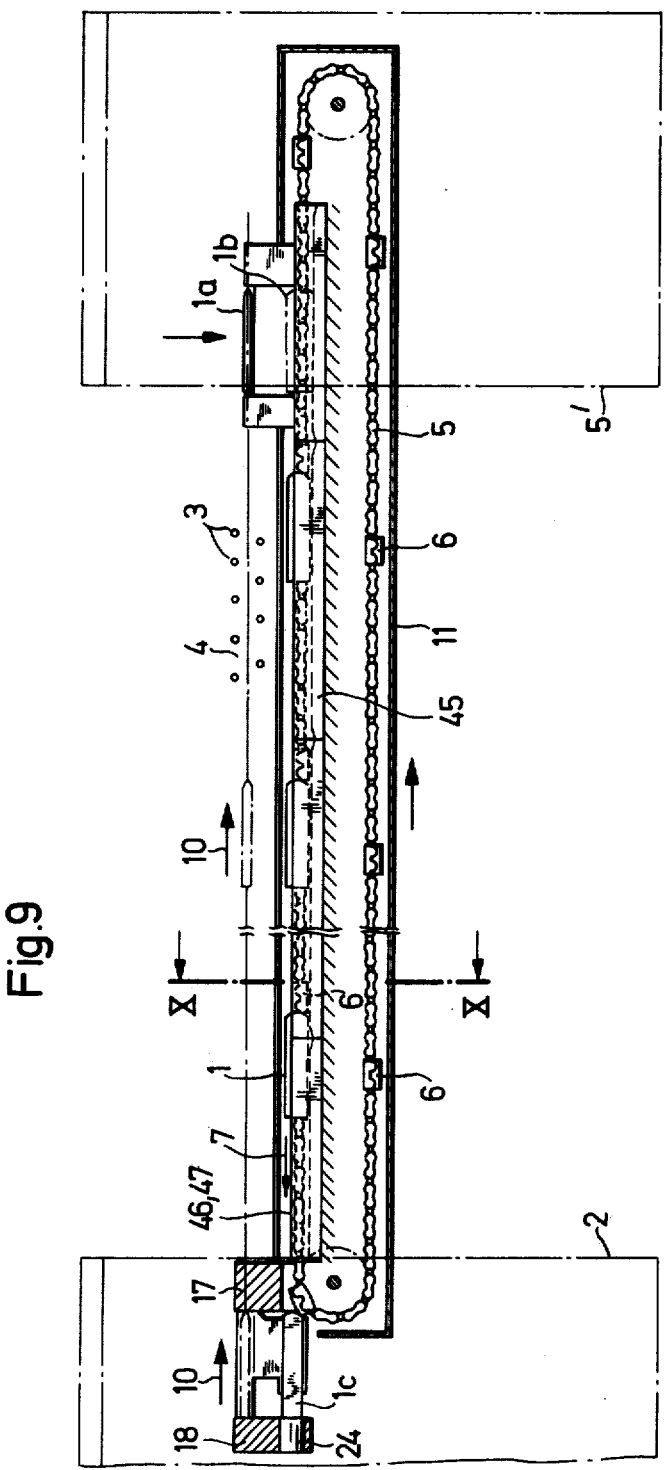
FIG. 9 shows a modification of the construction of FIG. 1.
Figure 10:
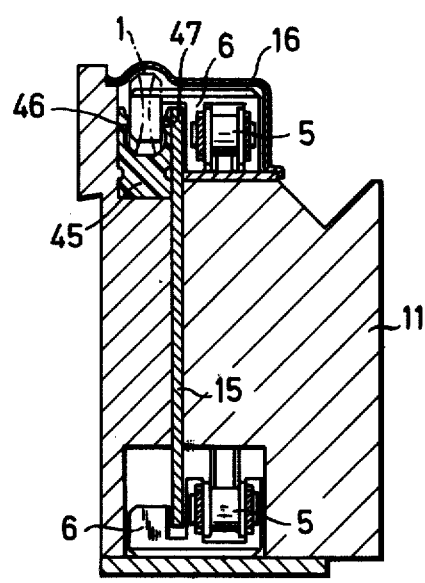
FIG. 10 is a sectional view taken on the line X — X in FIG. 9.

In the embodiment of FIGS. 9 and 10 the casing 11 for the return chain 5 includes a guide rail 45 made up of several sections and extending over the entire length of the return path for the shuttle. This rail may be made of a synthetic material such as an acetal resin (that sold under the trademark Delrin for example), and includes two elements 46 and 47 which are spring-stressed so as to exert a decelerative action on the shuttles over the entire return passage thereof from the catching to the picking side of the loom.

The rail 45 also produces the consequence that in the vicinity of the catching mechanism 5' the impact of the shuttles as they arrive from the position 1a to the position 1b is dampened. This reduces the wear imposed by the shuttles on the shuttle return race 12 such as might occur if the return path of the shuttles were defined exclusively by steel members as is indicated for the groove 12.

Either one or more than one braking element can be disposed along the return path. The shuttle may therefore be subject to deceleration over all or a portion of its return path. Moreover, the brake may be disposed either inside or outside the range of action of the carrying chain 5, e.g., between the elements 17 and 18. Whatever this position, non-uniform motion of the shuttles either in the catching mechanism, the picking mechanism or in the path between the two on the return journey from the catching to the picking mechanism is prevented.

While the invention has been described hereinabove in terms of a number of presently preferred embodiments, the invention is not limited thereto but rather comprises all modifications of and departures from those embodiments properly falling within the scope of the appended claims.

We claim:

1. Shuttle return apparatus for a loom having picking and catching mechanisms on opposite sides of a shed-forming mechanism, said return apparatus comprising an endless belt adapted to extend from the catching to the picking side of the loom, means defining a shuttle guide path along one run of the belt, plural means arranged on the belt to propel shuttles along said guide path, means to retard the motion of shuttles along said path, and a shutter retractably extensible across said guide path between said picking mechanism and retarding means.

2. Apparatus according to claim 1 wherein said retarding means comprise a shoe and resilient means stressing the shoe into frictional engagement with shuttles carried along said guide path by said propelling means.

3. Apparatus according to claim 1 wherein said retarding means include a stationary magnet whose field extends crosswise of said guide path.

4. Apparatus according to claim 3 wherein said magnet is an electro-magnet, said apparatus further including a photo-cell connected in circuit with said electromagnet and positioned to be actuated by the passage of shuttles along said guide path to energize said electromagnet.

5. Apparatus according to claim 1 wherein said retarding means includes means to lubricate shuttles moving in engagement with said retarding means along said guide path.

6. Apparatus according to claim 1 wherein the retarding means include a strip spring-stressed toward the shuttles over a portion of their passage along said guide path.

7. Apparatus according to claim 1 wherein said guide path-defining means comprise a rail, said rail including strip-like extensions on both sides of said guide path for frictional engagement with the shuttles.

8. Apparatus according to claim 7 wherein said rail is made of synthetic material and is removably mounted in an enclosure.

9. Apparatus according to claim 1 wherein said retarding means comprise a member extending into said guide path at a surface along which said member is subject to displacement from said guide path by cam action upon engagement of said member with shuttles moving along said guide path for one direction only of motion of the shuttles along said guide path.

10. Apparatus according to claim 9 wherein said member is mounted for arcuate motion about a fixed axis.

* * * * *